United States Patent
Adams et al.

(10) Patent No.: US 11,601,334 B2
(45) Date of Patent: Mar. 7, 2023

(54) RESOURCE COMMAND MESSAGES AND METHODS

(71) Applicant: Rateze Remote Mgmt. L.L.C., Wilmington, DE (US)

(72) Inventors: Mark A. Adams, Los Angeles, CA (US); Thomas Earl Ludwig, San Clemente, CA (US); Charles William Frank, Irvine, CA (US); Nicholas J. Witchey, Laguna Hills, CA (US)

(73) Assignee: Rateze Remote Mgmt. L.L.C., Wilmington, DE (US)

( * ) Notice: Subject to any disclaimer, the term of this patent is extended or adjusted under 35 U.S.C. 154(b) by 108 days.

(21) Appl. No.: 14/876,743

(22) Filed: Oct. 6, 2015

(65) Prior Publication Data

US 2016/0036641 A1 Feb. 4, 2016

Related U.S. Application Data

(63) Continuation of application No. 11/246,721, filed on Oct. 6, 2005, now Pat. No. 9,270,532.

(51) Int. Cl.
*H04L 41/0896* (2022.01)
*H04L 5/00* (2006.01)

(52) U.S. Cl.
CPC ........ *H04L 41/0896* (2013.01); *H04L 5/0053* (2013.01)

(58) Field of Classification Search
CPC .......................... H04L 41/0896; H04L 5/0053
USPC ................................................. 709/229, 204
See application file for complete search history.

(56) References Cited

U.S. PATENT DOCUMENTS

| | | |
|---|---|---|
| 4,890,227 A | 12/1989 | Watanabe et al. |
| 5,129,088 A | 7/1992 | Auslander et al. |
| 5,193,171 A | 3/1993 | Shinmura et al. |
| 5,506,969 A | 4/1996 | Wall et al. |
| 5,546,541 A | 8/1996 | Drew et al. |
| 5,590,124 A | 12/1996 | Robins |
| 5,590,276 A | 12/1996 | Andrews |
| 5,634,111 A | 5/1997 | Oeda et al. |

(Continued)

FOREIGN PATENT DOCUMENTS

| | | |
|---|---|---|
| CN | 1359214 | 7/2002 |
| EP | 0 485 110 | 5/1992 |

(Continued)

OTHER PUBLICATIONS

"Computer Networking Essentials" Copyright 2001, Cisco Systems, Inc., 2001.

(Continued)

*Primary Examiner* — Suraj M Joshi
*Assistant Examiner* — Sherman Lin
(74) *Attorney, Agent, or Firm* — Foley & Lardner LLP

(57) ABSTRACT

Resource command messages comprise commands and command urgency or importance information that is interpreted by a resource device and is coupled with information relating to the resource device to determine when to process the command within the resource command message. Resource devices comprising a plurality of resource nodes provide increased performance, responsiveness, and load balancing by multiple resource nodes processing the same resource command message in parallel.

13 Claims, 6 Drawing Sheets

(56) References Cited

U.S. PATENT DOCUMENTS

| | | | |
|---|---|---|---|
| 5,742,604 A | 4/1998 | Edsall et al. | |
| 5,758,050 A | 5/1998 | Brady et al. | |
| 5,758,188 A | 5/1998 | Appelbaum et al. | |
| 5,867,686 A | 2/1999 | Conner et al. | |
| 5,884,038 A | 3/1999 | Kapoor | |
| 5,889,935 A | 3/1999 | Ofek et al. | |
| 5,930,786 A | 7/1999 | Carino et al. | |
| 5,937,169 A | 8/1999 | Connery et al. | |
| 5,948,062 A | 9/1999 | Tzelnic et al. | |
| 5,949,977 A | 9/1999 | Hernandez | |
| 5,991,891 A | 11/1999 | Hahn et al. | |
| 6,018,779 A | 1/2000 | Blumenau | |
| 6,081,879 A | 6/2000 | Arnott | |
| 6,101,559 A | 8/2000 | Schultz et al. | |
| 6,105,122 A | 8/2000 | Muller et al. | |
| 6,128,664 A | 10/2000 | Yanagidate et al. | |
| 6,154,769 A * | 11/2000 | Cherkasova | G06F 9/5027 |
| | | | 709/207 |
| 6,157,935 A | 12/2000 | Tran et al. | |
| 6,157,955 A | 12/2000 | Narad et al. | |
| 6,181,927 B1 | 1/2001 | Welling et al. | |
| 6,202,060 B1 | 3/2001 | Tran | |
| 6,216,006 B1 * | 4/2001 | Scholefield | H04L 47/11 |
| | | | 455/450 |
| 6,246,683 B1 | 6/2001 | Connery et al. | |
| 6,253,273 B1 | 6/2001 | Blumenau | |
| 6,259,448 B1 | 7/2001 | McNally et al. | |
| 6,275,898 B1 | 8/2001 | Dekoning | |
| 6,288,716 B1 | 9/2001 | Humpleman et al. | |
| 6,295,584 B1 | 9/2001 | Desota et al. | |
| 6,330,236 B1 | 12/2001 | Ofek et al. | |
| 6,330,615 B1 | 12/2001 | Gioquindo et al. | |
| 6,385,638 B1 | 5/2002 | Baker-Harvey | |
| 6,389,448 B1 | 5/2002 | Primak et al. | |
| 6,396,480 B1 | 5/2002 | Schindler et al. | |
| 6,401,183 B1 | 6/2002 | Rafizadeh | |
| 6,434,683 B1 | 8/2002 | West et al. | |
| 6,449,607 B1 | 9/2002 | Tomita et al. | |
| 6,466,571 B1 | 10/2002 | Dynarski et al. | |
| 6,470,342 B1 | 10/2002 | Gondi et al. | |
| 6,473,774 B1 | 10/2002 | Cellis et al. | |
| 6,480,934 B1 | 11/2002 | Hino et al. | |
| 6,487,555 B1 | 11/2002 | Bharat et al. | |
| 6,532,509 B1 * | 3/2003 | Wolrich | G06F 9/3851 |
| | | | 710/240 |
| 6,549,983 B1 | 4/2003 | Han et al. | |
| 6,567,863 B1 | 5/2003 | Lafuite et al. | |
| 6,601,083 B1 * | 7/2003 | Reznak | G06F 9/5016 |
| | | | 710/240 |
| 6,601,101 B1 | 7/2003 | Lee et al. | |
| 6,601,135 B1 | 7/2003 | McBrearty et al. | |
| 6,618,743 B1 | 9/2003 | Bennett | |
| 6,629,264 B1 | 9/2003 | Sicola et al. | |
| 6,678,241 B1 | 1/2004 | Gai et al. | |
| 6,681,244 B1 | 1/2004 | Cross et al. | |
| 6,683,883 B1 | 1/2004 | Czeiger et al. | |
| 6,693,912 B1 | 2/2004 | Wang | |
| 6,701,431 B2 | 3/2004 | Sudramanian et al. | |
| 6,701,432 B1 | 3/2004 | Deng et al. | |
| 6,710,786 B1 | 3/2004 | Jacobs et al. | |
| 6,711,164 B1 | 3/2004 | Le et al. | |
| 6,725,252 B1 * | 4/2004 | Himmel | G06F 9/505 |
| | | | 709/203 |
| 6,732,171 B2 | 5/2004 | Hayden | |
| 6,732,230 B1 | 5/2004 | Johnson et al. | |
| 6,741,554 B2 | 5/2004 | D'Amico et al. | |
| 6,742,034 B1 | 5/2004 | Schudert et al. | |
| 6,754,662 B1 | 6/2004 | Li | |
| 6,757,845 B2 | 6/2004 | Bruce | |
| 6,772,161 B2 | 8/2004 | Mahalingam et al. | |
| 6,775,672 B2 | 8/2004 | Mahalingam et al. | |
| 6,775,673 B2 | 8/2004 | Mahalingam et al. | |
| 6,789,057 B1 * | 9/2004 | Morimoto | G06F 40/211 |
| | | | 704/7 |
| 6,795,534 B2 | 9/2004 | Noguchi | |
| 6,799,244 B2 | 9/2004 | Tanaka et al. | |
| 6,799,255 B1 | 9/2004 | Blumenau et al. | |
| 6,834,326 B1 | 12/2004 | Wang et al. | |
| 6,853,382 B1 | 2/2005 | Van Dyke et al. | |
| 6,854,021 B1 | 2/2005 | Schmidt et al. | |
| 6,862,606 B1 | 3/2005 | Major et al. | |
| 6,876,657 B1 | 4/2005 | Brewer et al. | |
| 6,886,035 B2 | 4/2005 | Wolff | |
| 6,894,976 B1 | 5/2005 | Banga et al. | |
| 6,895,461 B1 | 5/2005 | Thompson | |
| 6,895,511 B1 | 5/2005 | Borsato et al. | |
| 6,901,497 B2 | 5/2005 | Tashiro et al. | |
| 6,904,470 B1 | 6/2005 | Ofer et al. | |
| 6,907,473 B2 | 6/2005 | Schmidt et al. | |
| 6,912,622 B2 | 6/2005 | Miller | |
| 6,917,616 B1 | 7/2005 | Normand et al. | |
| 6,922,688 B1 | 7/2005 | Frey, Jr. | |
| 6,928,473 B1 | 8/2005 | Sundaram et al. | |
| 6,934,799 B2 | 8/2005 | Acharya et al. | |
| 6,941,555 B2 | 9/2005 | Jacobs et al. | |
| 6,947,430 B2 | 9/2005 | Bilic et al. | |
| 6,977,927 B1 | 12/2005 | Bates et al. | |
| 6,983,326 B1 | 1/2006 | Vigue et al. | |
| 6,985,956 B2 | 1/2006 | Luke et al. | |
| 6,993,587 B1 | 1/2006 | Basani et al. | |
| 7,039,934 B2 | 5/2006 | Terakado et al. | |
| 7,051,087 B1 | 5/2006 | Bahl et al. | |
| 7,065,579 B2 | 6/2006 | Traversat et al. | |
| 7,069,295 B2 | 6/2006 | Sutherland et al. | |
| 7,072,986 B2 | 7/2006 | Kitamura et al. | |
| 7,073,090 B2 | 7/2006 | Yanai et al. | |
| 7,111,303 B2 | 9/2006 | Macchiano et al. | |
| 7,120,666 B2 | 10/2006 | McCanne et al. | |
| 7,145,866 B1 | 12/2006 | Ting et al. | |
| 7,146,427 B2 | 12/2006 | Delaney et al. | |
| 7,149,769 B2 | 12/2006 | Lubbers et al. | |
| 7,152,069 B1 | 12/2006 | Santry et al. | |
| 7,181,521 B2 | 2/2007 | Knauerhase et al. | |
| 7,184,424 B2 | 2/2007 | Frank et al. | |
| 7,188,194 B1 | 3/2007 | Kuik et al. | |
| 7,200,641 B1 | 4/2007 | Throop | |
| 7,203,730 B1 | 4/2007 | Meyer et al. | |
| 7,206,805 B1 | 4/2007 | McLaughlin, Jr. | |
| 7,225,243 B1 | 5/2007 | Wilson | |
| 7,237,036 B2 | 6/2007 | Boucher et al. | |
| 7,243,144 B2 | 7/2007 | Miyake | |
| 7,260,638 B2 | 8/2007 | Crosbie | |
| 7,263,108 B2 | 8/2007 | Kizhepat | |
| 7,278,142 B2 | 10/2007 | Bandhole et al. | |
| 7,296,050 B2 | 11/2007 | Vicard | |
| 7,333,451 B1 | 2/2008 | Khalil et al. | |
| 7,353,266 B2 | 4/2008 | Bracewell et al. | |
| 7,406,523 B1 | 7/2008 | Kruy et al. | |
| 7,415,018 B2 | 8/2008 | Jones et al. | |
| 7,428,584 B2 | 9/2008 | Yamamoto et al. | |
| 7,436,789 B2 | 10/2008 | Caliskan et al. | |
| 7,447,209 B2 | 11/2008 | Jeffay et al. | |
| 7,463,582 B2 | 12/2008 | Kelly et al. | |
| 7,526,577 B2 | 4/2009 | Pinkerton et al. | |
| 2001/0020273 A1 | 9/2001 | Murakawa | |
| 2001/0026550 A1 | 10/2001 | Kobayashi | |
| 2001/0049739 A1 | 12/2001 | Wakayama et al. | |
| 2002/0016811 A1 | 2/2002 | Gall et al. | |
| 2002/0026558 A1 | 2/2002 | Reuter et al. | |
| 2002/0029286 A1 | 3/2002 | Gioquindo et al. | |
| 2002/0035621 A1 | 3/2002 | Zintel et al. | |
| 2002/0039196 A1 | 4/2002 | Chiarabini et al. | |
| 2002/0052962 A1 | 5/2002 | Cherkasova et al. | |
| 2002/0062387 A1 | 5/2002 | Yatziv | |
| 2002/0065875 A1 | 5/2002 | Bracewell et al. | |
| 2002/0087811 A1 | 7/2002 | Khare et al. | |
| 2002/0091830 A1 | 7/2002 | Muramatsu | |
| 2002/0126658 A1 | 9/2002 | Yamashita | |
| 2002/0165754 A1 * | 11/2002 | Tang | H04L 47/50 |
| | | | 705/7.22 |
| 2002/0165978 A1 | 11/2002 | Chui | |
| 2002/0178232 A1 * | 11/2002 | Ferguson | H04L 67/2847 |
| | | | 709/217 |

(56) References Cited

U.S. PATENT DOCUMENTS

| | | | |
|---|---|---|---|
| 2003/0018784 A1 | 1/2003 | Lette et al. | |
| 2003/0023811 A1 | 1/2003 | Kim et al. | |
| 2003/0026246 A1 | 2/2003 | Huang et al. | |
| 2003/0041138 A1 | 2/2003 | Kampe et al. | |
| 2003/0065733 A1 | 4/2003 | Pecone | |
| 2003/0069995 A1 | 4/2003 | Fayette | |
| 2003/0081592 A1 | 5/2003 | Krishnarajah et al. | |
| 2003/0097443 A1* | 5/2003 | Gillett | H04L 29/06 709/225 |
| 2003/0118053 A1 | 6/2003 | Edsall et al. | |
| 2003/0130986 A1 | 7/2003 | Tamer et al. | |
| 2003/0152041 A1 | 8/2003 | Herrmann et al. | |
| 2003/0161312 A1 | 8/2003 | Brown et al. | |
| 2003/0172157 A1 | 9/2003 | Wright et al. | |
| 2003/0182349 A1 | 9/2003 | Leong et al. | |
| 2003/0202510 A1 | 10/2003 | Witkowski et al. | |
| 2003/0204611 A1 | 10/2003 | McCosh et al. | |
| 2004/0025477 A1 | 2/2004 | Sichera et al. | |
| 2004/0047367 A1 | 3/2004 | Mammen | |
| 2004/0078465 A1 | 4/2004 | Coates et al. | |
| 2004/0100952 A1 | 5/2004 | Boucher et al. | |
| 2004/0181476 A1 | 9/2004 | Smith et al. | |
| 2004/0184455 A1 | 9/2004 | Lin | |
| 2004/0205110 A1* | 10/2004 | Hinshaw | G06F 17/30477 709/201 |
| 2005/0033740 A1 | 2/2005 | Cao et al. | |
| 2005/0058131 A1 | 3/2005 | Samuels et al. | |
| 2005/0102522 A1 | 5/2005 | Kanda | |
| 2005/0144199 A2 | 6/2005 | Hayden | |
| 2005/0166022 A1 | 7/2005 | Watanabe | |
| 2005/0175005 A1 | 8/2005 | Brown | |
| 2005/0188087 A1* | 8/2005 | Iyoda | G06F 9/505 709/208 |
| 2005/0198371 A1 | 9/2005 | Smith et al. | |
| 2005/0246401 A1 | 11/2005 | Edwards et al. | |
| 2005/0267929 A1 | 12/2005 | Kitamura | |
| 2005/0270856 A1 | 12/2005 | Earhart et al. | |
| 2005/0286517 A1 | 12/2005 | Babbar et al. | |
| 2006/0036602 A1 | 2/2006 | Unangst et al. | |
| 2006/0077902 A1 | 4/2006 | Kannan et al. | |
| 2006/0126118 A1 | 6/2006 | Nagata | |
| 2006/0133365 A1 | 6/2006 | Manjunatha et al. | |
| 2006/0168345 A1 | 7/2006 | Siles et al. | |
| 2006/0176903 A1 | 8/2006 | Coulier | |
| 2007/0101023 A1 | 5/2007 | Chhabra et al. | |
| 2007/0110047 A1 | 5/2007 | Kim | |
| 2008/0181158 A1 | 7/2008 | Bouazizi et al. | |
| 2008/0279106 A1 | 11/2008 | Goodfellow et al. | |

FOREIGN PATENT DOCUMENTS

| | | | |
|---|---|---|---|
| EP | 0 654 736 | 5/1995 | |
| EP | 0 700 231 | 3/1996 | |
| EP | 0 706 113 | 4/1996 | |
| JP | 07-325779 | 12/1995 | |
| JP | 2000-267979 | 9/2000 | |
| JP | 2001-094987 | 4/2001 | |
| JP | 2001-359200 | 12/2001 | |
| JP | 2002-252880 | 9/2002 | |
| JP | 2002-318725 | 10/2002 | |
| JP | 2004-054562 | 2/2004 | |
| JP | 2005-265914 | 9/2005 | |
| WO | WO-01/01270 | 1/2001 | |
| WO | WO 0128257 A1 * | 4/2001 | H04Q 3/0025 |
| WO | WO-02/15018 | 2/2002 | |
| WO | WO-2005/017738 A1 | 2/2005 | |

OTHER PUBLICATIONS

"Limited distributed DASD Checksum, a RAID Hybrid" IBM Technical Disclosure Bulletin, vol. 35, No. 4a, Sep. 1992, pp. 404-405, XP000314813 Armonk, NY, USA.

B. Quinn et al. IP Multicast Applications: Challenges and Solutions. Sep. 2001. Network Working Group, RFC 3170.

Bruschi and Rosti, "Secure multicast in wireless networks of mobile hosts: protocols and issues", Mobile Networks and Applications, vol. 7, issue 6 (Dec. 2002), pp. 503-511.

Canadian Office action for 2,632,889 dated Aug. 6, 2010.

Chavez A. et al. Association for Computing Machinery, Challenger: A Multi-Agent System for Distributed Resource Allocation, Proceedings of the First International Conference on Autonomous Agents Marina Del Rey, CA, vol. Conf 1 Feb. 5, 1997, pp. 323-332, New York, ACM, US.

Chavez, A Multi-Agent System for Distributed Resource Allocation, MIT Media Lab, XP-002092534.

Chinese Office action for 200580052247.7 dated Apr. 6, 2010.

Chinese Office action for 200580052247.7 dated Nov. 18, 2010.

European Office action for EP 05 804 426.4 dated Jul. 31, 2008.

European Office action for EP 05 804 426.4 dated Nov. 12, 2008.

Gibson, Garth; File Server Scaling with Network-Attached Secure Disks; Joint International Conference on Measurement & Modeling of Computer Systems Proceedings of the 1997 ACM SIGMETRICS International Conference on Measurement & Modeling of Computer Systems; pp. 272-284; 1997.

International Preliminary Report on Patentability for PCT/US2005/036026 dated Apr. 9, 2008.

International Search Report for Application No. PCT/US02/40205 dated May 27, 2004.

International Search Report for PCT/US2005/036026 dated Jul. 7, 2006.

Japanese Office Action dated Apr. 5, 2011, from related Japanese patent application No. 2008-535508.

Kim et al., "Internet Multicast Provisioning Issues for Hierarchical Architecture", Dept. of Computer Science, Chung-Nam National University, Daejeon, Korea, Ninth IEEE International Conference, pp. 401-404., IEEE, published Oct. 12, 2001.

Lee and Thekkath, "Petal: Distributed Virtual Disks", Systems Research Center, 1996.

Lee et al. "A Comparison of Two Distributed Disk Systems" Digital Systems Research Center—Research Report SRC-155, Apr. 30, 1998, XP002368118.

Lee et al. "Petal: Distributed Virtual Disks", 7th International Conference on Architectural Support for Programming Languages and Operation Systems. Cambridge, MA., Oct. 1-5, 1996. International Conference on Architectural Support for Programming Languages and Operation Systems (ASPLOS), New, vol. Con. 7, Oct. 1, 1996, pp. 84-92, XP000681711, ISBN: 0-89791-767-7.

Lin JC and Paul S, "Rmtp: a reliable multicast transport protocol," Proceedings of IEEE INFOCOM '96, vol. 3, pp. 1414-1424, 1996.

PCT International Search Report for PCT App. No. PCTUS05/01542 dated Aug. 25, 2008.

Satran et al. "Internet Small Computer Systems Interface (iSCSI)" IETF Standard, Internet Engineering Task Force, IETF, CH, Apr. 2004, XP015009500, ISSN: 000-0003.

Thomas E. Anderson, Michael D. Dahlin, Jeanna M. Neefe, David A. Patterson, Drew S. Roselli, and Randolph Y. Wang, Serverless network file systems. Dec. 1995. In Proceedings of the 15th Symposium on Operating Systems Principles.

U.S. Notice of Allowance dated Oct. 19, 2015, from related U.S. Appl. No. 11/246,721.

U.S. Office Action dated Dec. 23, 2008, from related U.S. Appl. No. 11/246,721.

U.S. Office Action dated Dec. 23, 2009, from related U.S. Appl. No. 11/246,721.

U.S. Office Action dated Feb. 4, 2011, from related U.S. Appl. No. 11/246,721.

U.S. Office Action dated Jul. 7, 2009, from related U.S. Appl. No. 11/246,721.

U.S. Office Action dated Jun. 23, 2010, from related U.S. Appl. No. 11/246,721.

U.S. Office Action dated Jun. 8, 2011, from related U.S. Appl. No. 11/246,721.

(56) References Cited

OTHER PUBLICATIONS

VMWare Workstation User's Manual, VMWare, Inc., p. 1-420, XP002443319; www.vmware.com/pdf/ms32_manual.pdf; p. 18-21; p. 214-216; p. 273-282, 1998-2002.
VMWare Workstations User's Manual, Version 3.2, VMWare, Inc., Copyright 1998-2002.

* cited by examiner

RESOURCE COMMAND MESSAGES AND METHODS

RELATED APPLICATIONS

The present is a continuation of and claims priority to pending U.S. patent application Ser. No. 11/246,721, filed Oct. 6, 2005, which is incorporated by reference herein in its entirety.

FIELD

The field of the invention is computing resource command messaging and resource devices.

BACKGROUND

Resource devices manage computing resources. There are myriad examples of such computing resources, extending from data storage on disk drives in storage arrays to connection processing within high volume content servers in server farms. Typically, resource devices comprise a plurality of resource nodes, thereby forming a distributed resource that appears as a single, logical resource device from the perspective of a resource consumer.

The resource nodes responsible for managing the physical resources, whether the resource nodes manage a data storage resource—or is an individual web server responsible for connection and content resources, must function efficiently, especially in complex environments comprising many resource consumers and resource devices. The efficiency depends on desirable characteristics including scalability, high performance, load balancing, low response times (responsiveness), or others characteristics that could require optimization. Resource nodes are typically either managed by external management systems, or have a management layer imposed on them, which unfortunately introduces extra overhead beyond the core responsibility of resource management. A resource device comprising a plurality of resource nodes exacerbates the external management problem. For example, as resource nodes become loaded, they typically inform resource consumers of their state, shift resource requests to other resource nodes, or perform other out-of-band management communications to maximize performance resulting in excessive out-of-band communication. Such systems suffer from scalability issues because as new resource nodes are added to the environment, the management "chatter" increases subtend a larger fraction of communication and processing bandwidth, which negatively impacts performance. Due to such coarse grained scalability, the cost to incrementally enhance the capability of the system increases, and the cost to replicate the entire system becomes prohibitive.

To reduce costs and achieve other desirable results, it is advantageous to design a system in which each individual resource node functions independently of other resource nodes or external management systems. In other words, a resource node should not require information regarding other resource nodes to perform it primary responsibility of managing a resource. To service resource consumers who desire access to a resource, autonomous resource nodes should determine when to process commands from a resource consumer based upon, or at least determined as a factor of, (a) information relating to the resource node and (b) any information supplied by the resource consumer within the message comprising the command.

Beyond supplying command information, resource consumers supply information regarding their desired urgency or importance for having a command processed. When resource consumers understand the behavior of the autonomous resource nodes, benefits of scalability, performance, or responsiveness are achieved naturally, without imposing additional functionality, because resource consumers are able to adjust their resource command messages based upon the interactions with all the resource nodes to gain higher performance.

Current related art attempts to provide efficient access to computing resources by focusing on activities external to resource consumer-resource node interactions rather than on the natural behavior resulting from their interactions. The related art imposes additional functionally to optimize desirable characteristics. For example, related art might require resource consumers to communicate with other resource consumers, resource nodes to communicate with other resource nodes, or communicate with a communication path to manage communications between resource consumers and resource nodes.

Sun Microsystems' U.S. Pat. No. 5,506,969 titled "Method and apparatus for bus bandwidth management" teaches how to efficiently schedule bus accesses from multiple applications to peripheral modules on a high-speed bus. Although the patent describes how the bus between the applications and modules is managed, it requires a bus management system rather than allowing the individual module's and application's behavior to have the desired performance result. The applications do not employ resource command messages comprising of urgency or importance information that allows the modules to determine when to process requests.

Hewlett-Packet Development Company's U.S. Pat. No. 6,886,035 titled "Dynamic load balancing of a network of a client and server computer" teaches how client computers optimize throughput between themselves and a resource through the use of redirection. Redirection requires a host the network to be knowledgeable of other hosts on the network beyond itself. The scalability of the system is reduced because each additional element added to the system must be managed and incorporated into the system to ensure it has sufficient knowledge for redirection. The load-balancing is not achieved naturally as it would be through the use of urgency or importance information within commands messages.

EMC Corporation's U.S. Pat. No. 6,904,470 titled "Device selection by a disk adapter scheduler" teaches how to efficiently schedule resource I/O requests of based upon urgency and priority of requests. The patent describes how a main scheduler determines what type of scheduler should be used to manage various I/O tasks directed toward logical volumes managed by a disk adapter. Although logical volumes are associated with physical data storage resources, they are a coherent virtual device. Therefore, each disk adapter is responsible for a device rather than a resource and imposes additional management capabilities to ensure load-balancing, performance, and other qualities across the logical volumes. The '470 patent does not address the autonomous behavior of a resource node whose behavior naturally results from the use of urgency or importance information used along with the resource node information to determine when tasks are issued.

None of the related art addresses the need for autonomous resource nodes whose behavior naturally results in desired characteristics including scalability, high performance, load balancing, or responsiveness. To fully realize the benefits of autonomous resource nodes, a solution would preferably include the following characteristics:

Resource nodes determine when to handle commands from resource consumers based upon information relating to the command and relating to the resource node's own information.

Messages sent from resource consumers to resource nodes indicate the resource consumer's sense of urgency or importance related to processing the message or the command within the message.

Resource nodes that are able to determine when to handle commands sent to them result in several advantages. First, each individual resource node focuses on its main responsibilities rather than on other non-resource centric tasks; therefore, the resource node functions with a higher efficiency than a similar resource node that has additional management tasks to perform. Second, multiple resource consumers are able to interact with multiple resource nodes of a resource device without an extraneous arbitrator. This results in improved response time because each resource node is able to determine independently which resource consumer deserves (if applicable) attention. Third, when multiple resource nodes provide access to redundant resources, and the resource nodes are addressed simultaneously, the collection of resource node automatically load balance because each resource devices functions to its fullest capabilities. If one redundant resource node is fully loaded, another redundant resource node is able to service requests without external intervention. Additionally, any of the redundant resource nodes are capable of providing a valid response to a resource consumer; therefore, the responsiveness of the system is higher than a resource device without redundant resource nodes. Fourth, the scalability of such an environment is high because each resource node is independent and does not require additional information from resource consumers or other resource nodes and can integrate into the environment easily. Although only a few advantages are presented, other contemplated advantages are naturally inherent in the presented subject matter.

Thus, there remains a considerable need for methods and apparatus that provide for resource command messages and resource devices comprising one or more resource nodes that autonomously determine when to process resource command messages based upon the contents of the command message and on information associated with the resource node.

SUMMARY

One aspect of the invention is directed toward a resource command message comprising a command and command parameters comprising an indication of the command's urgency or the command's importance. Resource consumers construct resource command messages to interact with resource nodes composing a resource device. A resource node processes resource command messages based upon the urgency or importance of the resource command message in addition to information centric to the resource node. Furthermore, a resource device can comprise a plurality of resource nodes where each resource node has an ability to operate independently of all other nodes and each resource node is able to receive the resource command message. The urgency or importance with a resource command message includes relative or absolute values.

In another aspect, the present invention is directed toward a method of processing resource command messages. The method includes interpreting command urgency or command importance information within the resource command message and combining the information along with resource node information to establish when the command within the resource command message will be processed. The method also includes a step of determining the ordering in which commands in a command queue are processed based upon when the command is to be processed Through the determination, the command could be processed immediately, delayed in processing, never processed, or could have its processing order changed relative to other commands sent previously or subsequently. Furthermore, the method includes processing resource command messages by more than one resource node that composes a resource device.

In still yet another aspect, the present invention is directed toward a method of accessing a resource device through creating a resource command message that includes a command and command parameters comprising at least one of a command urgency or command importance. The method also includes sending the resource command message to a resource device and determining when to process the command within the resource command message. When a resource device comprises a plurality of resource nodes, sending resource command messages include multicasting to at least some of the resource nodes.

In preferred embodiments, resource nodes within a resource device can operate as autonomous entities, each responsible for its own individual resources. Resource consumers acquire resources from resource nodes to fulfill their individual functions, and are also autonomous entities. As resource consumers require resources, they send resource command messages to the resource device with an indication of the urgency of the command or the importance of the command to acquire the resources, to reserve the resources, to use the resource, or to interact with the resource in other ways. Because resource nodes are autonomous and service requests from multiple resource consumers, the resource nodes fold information regarding their state, history, capabilities, or other relevant information together with their interpretation of the urgency or importance information to decide how or when to process the command. As used herein, the phrase "when to process" means autonomously handling the processing of a command and should be interpreted broadly including time based processing, order of processing, or other process handling concepts.

It is contemplated that resource consumers and resource nodes can communicate over a path that is outside the control of the consumers or nodes. To ensure high performance or reliability, in a preferred embodiment, a resource device comprises a plurality of resource nodes, where each resource node is responsible for all or some fraction of the resource and also functions independently of all other nodes, devices, or consumers. When resource nodes provide redundant resources, resource consumers send resource command messages to some or all the resource nodes, and given the current conditions of the network or loading the most capable resource node will respond. Furthermore, other resource nodes interpret additional resource command messages or resource command responses as instructions to suspend or stop processing of previously unprocessed commands to reduce multiple responses. Through autonomous operation of resource nodes coupled with resource command urgency or importance an overall load balanced system is achieved without requiring out-of-band communications.

Glossary

The following descriptions refer to terms used within this document. The terms are provided to ensure clarity when discussing the various aspects of the invention matter without implied limitations.

"Resource device" means a logical device that is addressable, in whole or in part, on a communication path, and provides access to a commodity used as a computing resource by a resource consumer. Logical resource devices are contemplated to include physical devices or virtual devices. Physical resource devices include computers, monitors, hard disk drives, power supplies, or other physical elements. Virtual resource devices include addressable video displays, logical storage volumes, a web server farm with a URL, or other abstractions of physical elements. Resource consumers interpret each resource device as a coherent whole device, regardless of its actual physical or virtual structure.

"Resource consumer" means an entity that requires access or control over a commodity to perform its desired functions. Resource consumers include computers, applications, users, web server gateways, or other entities that are able to communicate with resource nodes over a communication path; therefore, resource consumers are also addressable. It is contemplated that a resource devices can at times function as a resource consumer.

"Resource node" means a portion of a resource device that represents a fraction of a larger resource device, up to and including the complete resource device. Resource nodes can also operate as independent, addressable entities on the communication path. Contemplated resource nodes include logical partitions that combine with other logical partitions to form a logical volume from the perspective of resource consumers, addressable video frames, individual web servers in a server farm, or other constituent elements.

The teachings herein may be advantageously employed by developers and producers of computing resources including storage devices, or media content servers to create efficient, scalable systems that deliver high performance and fast response.

Various objects, features, aspects, and advantages of the present invention will become more apparent from the following detailed description of the preferred embodiments of the invention, along with the accompanying drawings in which like numerals represent like components.

DETAILED DESCRIPTION

The following detailed description refers to examples based upon disks in a storage array and web servers in a server farm, and illustrate applicability of the inventive subject matter. Although these two examples are used, myriad other examples could be provided, so that no implied limitations should be drawn from these examples.

Figure 1:
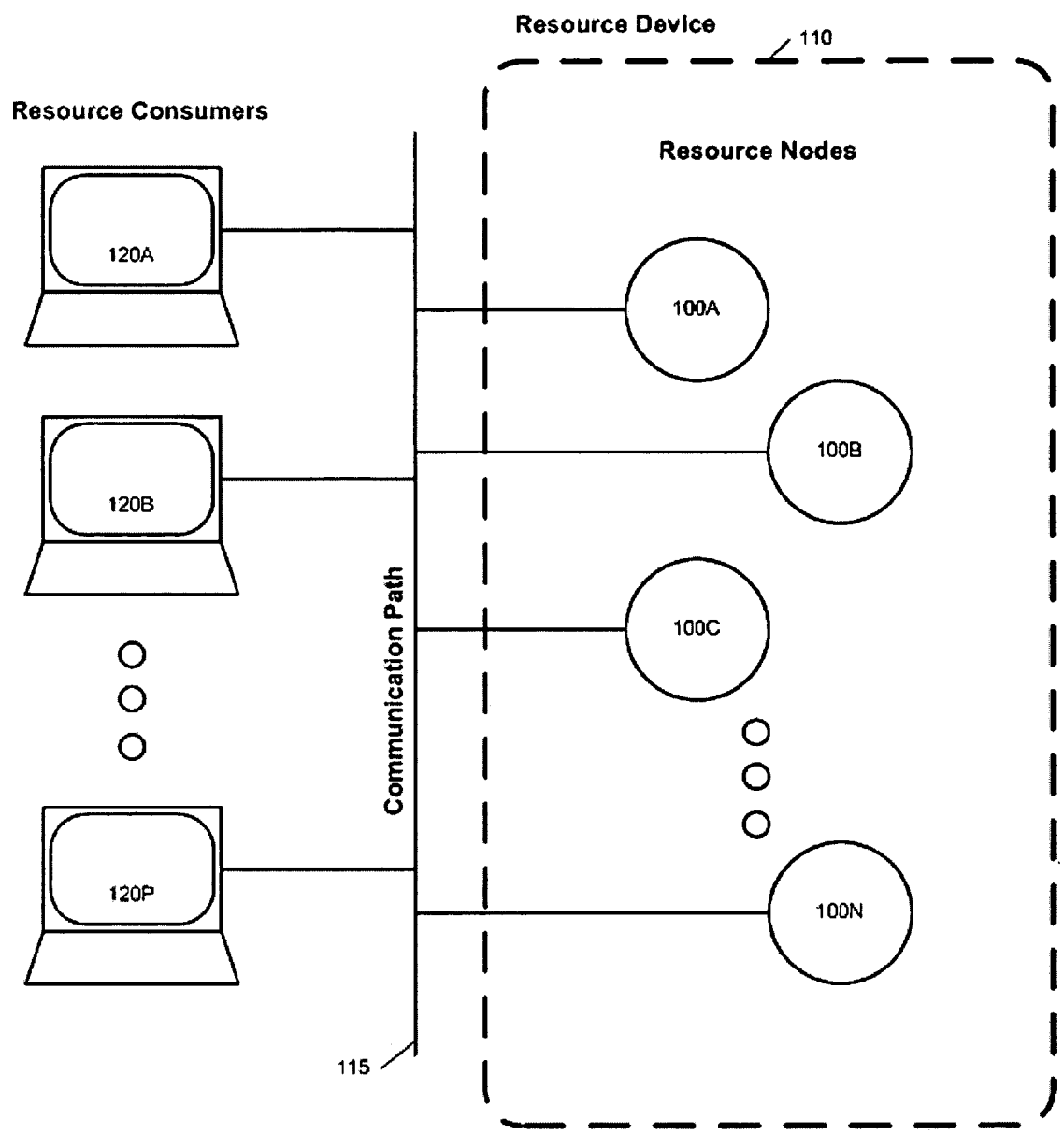
FIG. 1 represents an environment where resource consumers interact with a resource device comprising multiple resource nodes.

FIG. 1 represents an environment where resource consumers interact with a resource device comprising one or more resource nodes. Resource device 110 comprises one or more resource nodes 100A through 100N. Each individual resource node is communicatively coupled to one or more resource consumers 120A through 120P through communication path 115. In a preferred embodiment many resource consumers interact with many resource devices.

Resource Consumers

Resource consumers 120A through 120P operate independently of each other and do not require information from other entities beyond resource nodes 100A through 100N to interact with the desired resources managed by resource nodes 100A through 100N.

Resource consumers 120A through 120P comprise a combination of hardware, software, or firmware that includes instructions within a computer readable memory programmed to interact with resource device 110, and to access the resources managed by resource nodes 100A through 100N. In a preferred embodiment, resource consumer comprises a computer running an application or an operating system that desires access to a resource. In a yet more preferred embodiment, a resource consumer comprises a workstation with a driver that provides for communications between the workstation's operating system and resource nodes 100A through 100N. The driver also provides the operating system with enough information regarding resource device 100 that resource device 100 appears as a locally connected device. For example, a Windows® computer wishes to mount a logical volume for storage. The Windows® computer includes a driver that accepts I/O commands from the file system and transforms them into message transferred over a network to logical partitions composing the logical volume in a manner that is transparent to the file system or applications accessing the logical volume. The logical volume appears as a locally attached disk drive.

Alternatively, resource consumers 120A through 120P are contemplated to comprise applications that directly interact with resource nodes 100A through 100N. For example, a gateway to a web site could represent a resource consumer that accesses a distributed web server farm where an individual web server represents a resource node.

Although resource consumers 120A through 120P operate independently of each other, they interact with resource nodes 100A through 100N collectively or individually. In addition, resource consumers 120A through 120P do not require information from a system external to the resource consumers 120A through 120P or resource nodes 100A through 100N, including name servers, metadata servers, or other extraneous systems. It a preferred embodiment, it is contemplated that resource consumers 120A through 120P comprise the ability to discover resource nodes 100A through 100N. The ability to discover includes sending a broadcast message over communication path 115 to which resource nodes 100A through 100N respond with their individual names. Furthermore, in a preferred embodiment resource consumers 120A through 120P use name resolution to convert responses from resource nodes 100A through 100N into addresses on communication path 115. One skilled in the art of network programming will appreciate there are numerous ways to conduct discovery and name resolution including SSDP, DNS, WINS, or others.

Once resource consumers 120A through 120P have established communications with resource nodes 110A through 100N, resource consumers 120A through 120P send resource command messages addressed to resource device 110. The resource command messages can be addressed to resource device 110 in whole or in part. In a preferred embodiment, resource commands messages are sent to resource nodes 100A through 100N collectively through multicast where resource device 110 is addressed in whole, although it is contemplated that unicast messaging where resource device 100 is address in part is also possible. In this context "multicast" means sending a single message over communication path 115 where two or more of resource nodes 100A through 100N receive the message without requiring a resource consumer to consume bandwidth on communication path 115 by sending more than one copy of the message to each resource node. It is also contemplated that resource device 110 can be addressed simultaneously through multicast and unicast messaging.

Resource consumers 120A through 120P each construct resource command messages that comprise command parameters regarding their individual specific needs. It is contemplated that at least a port of the resource command message will reside in a memory as it is constructed. As used herein, the term "memory" means any hardware that stores information, no matter where the memory is located or how the information is stored. The command parameters include the resource consumer's sense of urgency or importance relative to having their need satisfied. Urgency gives a sense of the timing constraints while importance gives a sense of priority desired by the individual resource consumer. Resource nodes 100A through 100N use the urgency or importance command parameters and other command parameters to aid in the determination of when to process the resource command message. In a preferred embodiment, resource consumers determine their urgency or importance based upon their own internal information or based information gathered from responses from resource nodes. Furthermore, in a more preferred embodiment, command parameters include command identifiers used to correlate a group of related resource command messages.

Resource consumers 120A through 120P each comprise the ability to receive more than one response from a single resource command message. In cases where resource device 110 comprises redundant resources managed by resource nodes 100A through 100N, then more than one of resource node 100A through 100N responds to a message. Multiple responses are expected because each resource node functions independently from other nodes and does not know if a response has already been generated. However, multiple responses are quenched due to proper handling of urgency or importance information.

In a preferred embodiment, resource consumers 120A through 120P employ a slow start algorithm to avoid congestion to ensure efficient use of bandwidth and to reduce multiple responses from resource nodes. By initially sending small resource commands messages slowly, resource consumers 120A through 120P determine which of resource nodes 100A through 100N are likely to response first, then the each individual resource consumer 120A through 120P are able to adjust their urgency or importance information independently to aid in reduction of multiple responses. For example, a slow start algorithm could break large command messages into smaller command messages, and send the smaller messages slowly. As responses are received, the algorithm begins sending larger messages more quickly. Slow start ensures networking equipment with small buffers is not flooded with large packets. If they become flooded, network performance drops. In addition, a slow start provides resource consumers an opportunity to detect which resource nodes are initially more responsive. As packets are sent slowly at first, a window is provided to allow multiple responses from the resource nodes. Resource consumers can use the multiple responses to establish a preferred provider of the resource. Preferred provider information can then be used to quench multiple responses as the communication speeds up.

Resource Devices

Resource device 110 comprises one or more resource nodes as indicated by resource nodes 100A through 100N. Although FIG. 1 depicts a single resource device, it is contemplated that multiple resource devices coexist on communication path 115.

Resource device 110 is accessible by one or more of resource consumers 120A through 120P; therefore, resource device 110 can be a shared resource. In a preferred embodiment, resource device 110 includes information residing on resource nodes 100A through 100N to indicate when resource device 110 is privately owned or shared among resource consumers 120A through 120P.

Resource device 110 comprises an identifier used by resource consumers 120A through 120P to differentiate resource device 110 from other resource devices on communication path 115. In a preferred embodiment, the identifier comprises a name stored in the memory of resource nodes 100A through 100N wherein the name is resolvable to an address on communication path 115. When resource consumers 120A through 120N issue discovery requests, resource nodes 100A through 100N responds with a name that comprises the name of resource device 110 indicating they belong to resource device 110. In an especially preferred embodiment, the name resolves to an IP address which can include a unicast or multicast address. It is contemplated resource consumers 120A through 120P can address resource device 110 through a single address, preferable an IP multicast address.

In a preferred environment resource device 110 comprises redundant resource nodes where two or more of resource nodes 100A through 100N manage duplicate resources. For example, if resource device 110 represents a logical volume used by resource consumers 120A through 120P to store data, resource node 100A and resource node 100B could represent logical partitions that mirror the same stored data. Yet another example includes a case where resource device 110 represents a logical web server where each of resource nodes 100A through 100N are individual servers and have equivalent ability to processes incoming connections requesting content.

As an example of a resource device with redundant resource nodes, consider a storage array implemented based upon Zetera® technology where a logical volume, a resource device, is virtualized as a plurality of IP addressable logical partitions, resource nodes. The logical volume represents a single virtual disk with logical block addresses (LBA) ranging from 1 to a maximum value of MAX. Each logical partition is responsible for a set of LBAs, not necessarily continuous or contiguous, wherein the collection of logical partitions cover the entire range of LBAs, 1 to MAX. Furthermore, two or more logical partitions are redundant when they are responsible for an identical set of LBAs; thereby producing a mirror of the data. Workstations mount the logical volume as if it were a locally connected disk. A driver handles all communications with the logical partitions over a network sending command messages via multicast to all the logical partitions using a single address.

Another example of a resource device with redundant nodes is a web server farm where each server is able to serve identical content to browsers. A gateway sends requests coming from the Internet via command messages to the servers collectively. The first server to respond handles the connections.

It is contemplated resource device 110 could represent other computing resources including, processor bandwidth, displays, memory, servable content, connection handling, network bandwidth, or other computing related resources.

Communication Path

Communication path 115 provides support for addressing and data transport among resource consumers 120A through 120P and resource nodes 100A through 100N. It is contemplated that communication path 115 is not under the direct control of the resource nodes or resource consumers; however, it is contemplated resource consumers 120A through 120P or resource nodes 100A through 100N could alter the behavior of communication path 115. In addition, it is contemplated that communication path 115 comprises characteristics that render it unreliable.

In a preferred embodiment, communication path 115 comprises a packet switched network comprising Ethernet communication transporting an internet protocol. In the preferred embodiment, resource consumers 120A through 120P and resource nodes 100A through 100N acquire IP addresses through DHCP.

Resource Nodes

Figure 2:
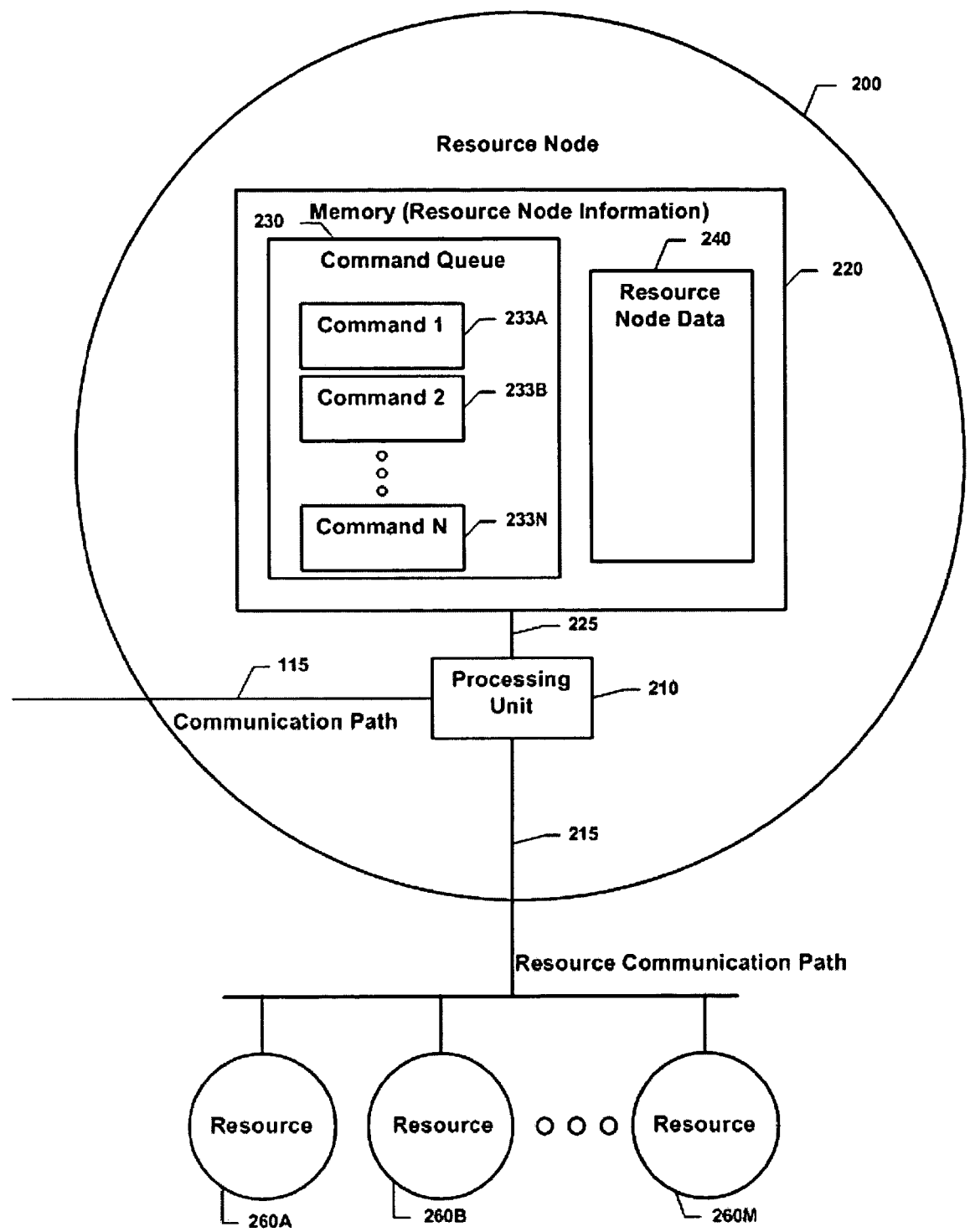
FIG. 2 represents a schematic of a possible physical embodiment of a resource node.

FIG. 2 represents a possible physical embodiment of a resource node. Resource node 200 receives resource command messages from resource consumers over communication path 115. Processing unit 210 receives the resource command messages and processes the commands within the message through the use of command queue 230 stored in memory 220. The command from the message is placed in command queue 230 as represented by commands 233A through 233N. Processing unit 210 processes commands 233A through 233N according to resource node information stored in memory 220 including command queue 230 or resource node data 240. As processing unit 210 processes commands 233A through 233N, processing unit 210 accesses resources 260A through 260M over resource communication path 215.

It is contemplated, resource node information stored in memory 220 comprises sufficient information to allow resource node 200 to function independently of other resource nodes and to focus on its main set of responsibilities. In a preferred embodiment, one element of hardware comprising processing unit 210 and memory 220 services one or more resource nodes. For example, a disk drive with a data storage resource could be adapted with a memory and processing unit to offer a number of logical partitions, each with their own IP address and each responsible for a set of LBAs. Alternatively, a rack-mount enclosure supporting a plurality of disk drives could include one or more CPUs forming processing unit 210 and could include a one or more RAM modules forming memory 220. The rack-mount enclosure could then offer many logical partitions that have responsibility across the plurality of disk drives. It is also contemplated that resource node 200 could represent a single resource. For example, a logical partition with an address could be responsible one complete disk drive.

Resource communication path 215 provides the addressing and data transfer between processing unit 210 and resource 260A through 260M. In a preferred embodiment, resource communication path 215 comprises a disk drive communication bus. Examples of disk buses include ATA, SCSI, Fibre Channel, USB, or others existing or yet to be invented. It is also contemplated that resource communication path 215 could include a packet switched network. For example, in the case where resource node 200 is a content server, resource communication path 200 could be an IP network to a storage array that houses content.

Resource node 200 determines when to processes commands 233A through 233N based upon interpreting the urgency or importance information found in each resource command message and on interpreting resource node information stored in memory 220. Resource node 200 uses information about itself to make an assertion of a proper way to handle commands autonomously. Information about resource node 200 includes ability to process commands, capacity, loading, command queue ordering, previous commands stored in command queue, or other relevant information that impacts servicing resource command messages from resource consumers. For example, if resource node 200 is functioning at 100% capacity servicing many resource consumers, it can determine that it will not service a current resource command message by silently discarding it while processing its current load. The resource consumer whose resource command message was dropped can attempt another command, possibly adjusting the message's urgency or importance, or can wait for another resource node to respond.

Information relating to resource node 200 stored in memory 220 can advantageously comprise instructions and data that determine the behavior of resource node 200. In an especially preferred embodiment, resource node data 240 includes information for use by resource consumers to construct an understanding of the overall resource device including the name of the resource device to which the resource node belongs, the name of the resource node, the role the resource node plays in the resource device, attributes, or other resource node information. This implies the resource node data 240 also represents resource device information.

In a preferred embodiment resource node 200 focuses on handling its responsibilities without performing extraneous tasks to enhance desirable characteristic of the resource device. This allows resource node 200 to fully utilize its capabilities toward servicing requests without negatively impacting performance or responsiveness. Furthermore, duplicates of resource node 200 provide enhanced capabilities from the perspective of resource consumers.

Redundant Resource Nodes

Redundant resource nodes are resource nodes that provide access to nearly identical resources. Redundant resource nodes can be differentiated by resource node data 240, name or address, for example. However, each redundant resource node has responsibility for the same type of resource and has equivalent ability to service resource command messages subject to their loading, capabilities, or other abilities. An example of redundant resource nodes includes logical partitions that have responsibility for the same set of LBAs within a logical volume but on different disks or two web servers capable of serving identical content. In a preferred embodiment, redundant resource nodes can participate in the same multicast group where a resource consumer is able to address them simultaneously.

In a preferred embodiment, resource consumers send resource command messages to the resource nodes of a resource device without regard to which resource nodes will actually process the resource command message. In the case of redundant resource nodes, a resource command message will potentially be processed substantially in parallel by the redundant resource nodes. As used herein, "substantially in parallel" means at least two resource nodes process the resource command message within ten seconds of each other due to the timing characteristics of the communication path and the resource nodes. Timing characteristics include latency, node loading, or other parameters that affect the processing time including those directly imposed by the resource consumer or resource nodes.

It is contemplated that redundant resource nodes can generate multiple responses to resource command messages, which potentially consume bandwidth. In a preferred embodiment resource nodes and resource consumes interact in a manner that attempt to quench multiple responses. It is also contemplated that resource consumers can initiate an exchange of multiple resource command messages expecting multiple responses. In a preferred embodiment the resource consumer selects a preferred provider from among the responding resource nodes, and then includes the preferred provider information in subsequent resource command message urgency. If a resource node is a preferred provider, it processes the resource command message normally. If a resource node is not a preferred provider, it delays processing. When the preferred provider, responds, the resource consumer sends its next message. The non-preferred provider resource nodes receive the next message and cancel a previously sent pending command. It is also contemplated that the current command could take over the previous command's position in the command queue.

It is contemplated that resource command messages can comprise command identifiers that are used to identify a group of related commands. In that situation, if a resource node has a command in its command queue and receives an additional related command, the resource node can interpret this sequence of events as an instruction to suspend the processing of the previous command, including deleting the command, thereby reducing the number of potential multiple response.

Resource node 200 can execute commands or reserve resources for future use based upon the command and command parameters in a resource command message. Executing a command provides for actual servicing resource command messages. Reserving resources allows resource consumers to aggregate abilities of multiple resource nodes.

Resource Command Messages

Figure 3:
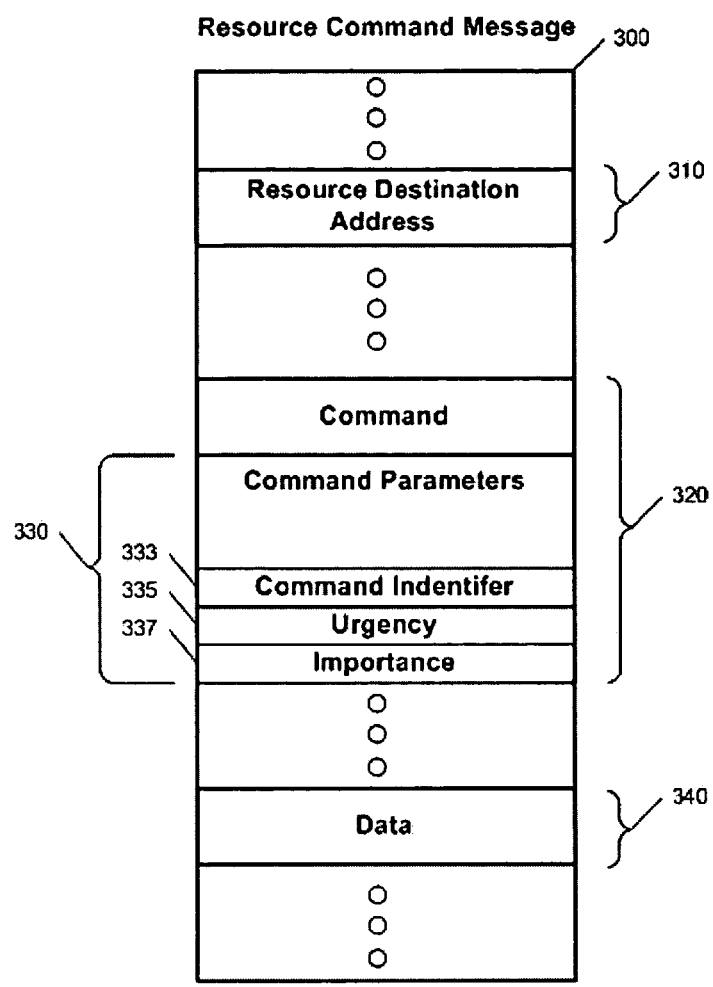
FIG. 3 represents a schematic of a possible resource command message stored in a computer readable memory.

FIG. 3 represents a possible schematic of a resource command message. Resource command message 300 comprises command 320 having command parameters 330 to be processed by a resource node. In a preferred embodiment, resource consumers address resource command message 300 to a resource device or a resource node via resource destination address 310. Resource command message 300 also optionally includes data 340. For example, data 340 is present if command 320 indicates a write command to a disk drive where data 340 represents the target data to be written. In a preferred embodiment, resource command 320 comprises command urgency 335 or command importance information 337. In yet a more preferred embodiment, resource command 320 comprises command identifiers 333. As used herein the term "indicates" means something that can be resolved to something else. Thus, the wording "command 320 indicates a write command" means that command 320 can be resolved to a write command."

A resource consumer constructs resource command message 300 in a computer readable memory wherein at least a portion of resource command message 300 resides. Once constructed, resource command message 300 is sent over the communication path coupling the resource consumer to resource nodes. It is contemplated that resource command message 300 could also be sent while being constructed. In a preferred embodiment, resource command message 300 is encapsulated into a datagram and sent over a packet switched network. In an especially preferred embodiment, resource command message 300 is sent using User Datagram Protocol (UDP) as a transport. UDP has reduced processing overhead relative to Transmission Control Protocol (TCP), and lends itself to the atomic command structure where information from one command is unnecessary in the processing of another command. Contemplated commands include conducting I/O processing, reading data, writing data, allocating a resource, reserving a resource, managing a resource, checking status of a resource, conducting an inventory of a resource, logging resource events, locking a resource, or other resource related operation. Resource nodes use command parameters 330 coupled with their own information to determine when to process command 320.

Command Identifier

Command Identifier 333 comprises information to group two or more related commands. It is contemplated command identifier 333 comprise a value unique to a grouping of commands. Commands are grouped for a number of reasons. For example, when a file system requests file data comprising a large number of LBAs to be read from a logical volume comprised of a plurality of mirrored logical partitions, a driver breaks the requests into individual resource command messages for each LBA or for related groups of LBAs. Each mirrored logical partition could respond to each resource command message generating multiple responses. However, when a resource node detects a new read command within the command group identified by command identifier 333, the resource node suspends processing of the previous command reducing the potential of a multiple response to the previous resource command message. It is also contemplated that a resource node could halt the processing of a currently executing command, or could suspend the response of a command that has been processed. In a preferred embodiment, command identifier 333 comprises an ID number or a sequence number.

It is also contemplated that command identifier 333 represents a series of bid-response transactions. For example, if a web server gateway has a larger number of connections that require attention beyond the capability of a single web server. The gateway sends resource command message 300 with the number of connections in data 340 and with command identifier 333 to all the web servers operating as resource nodes. Each web server capable of responding, reserves is capacity and sends a response. The gateway aggregates the responses, sending a subsequent command with the same command identifier 333 instructing the participating web server to handle the connections. Furthermore, the non-participating web server interprets the subsequent command as an instruction to stop processing the commands with the same command identifier 333.

Urgency

Urgency 335 (used here as a noun) comprises information relating to the timing of processing command 320. It is contemplated resource nodes infer from urgency 335 the actual timing for when a command is to be processed and the ordering of commands in a command queue. Contemplated urgencies include relative timing information or absolute timing information. Relative timing information includes specifying a desire for processing within a time window. Absolute timing information includes specifying a specific time to be processed from the resource consumer's perspective or the resource node's perspective.

Resource nodes fold urgency 335 together with their own information as well. In a preferred embodiment, urgency 335 includes a resource consumer's preferred provider. The resource node that matches the preferred provide infers urgency higher than a resource node that does not match the preferred provider. For example, a preferred provider resource node processes the command normally whereas a non-preferred provider resource node processes the command with a delay. This approach provides several benefits: multiple responses are reduced conserving bandwidth, and allows another resource node to take over as preferred provider if the original preferred provider is unable to respond fast enough, thereby ensuring high responsiveness.

Importance

Importance 337 (used here as a noun) comprises information relating to the priority of processing command 320. It is contemplated priority includes relative priority or absolute propriety. Relative priority includes quality of service (QoS) information. Absolute priority includes discreet levels possibly associated with a command queue. It is contemplated that resource nodes process resource command messages from multiple resource consumers and use importance information to help resolve the ordering of command to be processed.

Resource nodes use command parameters including urgency 335 or importance 337 to determine a final ordering of commands to be processed.

Command Queue

Figure 4:
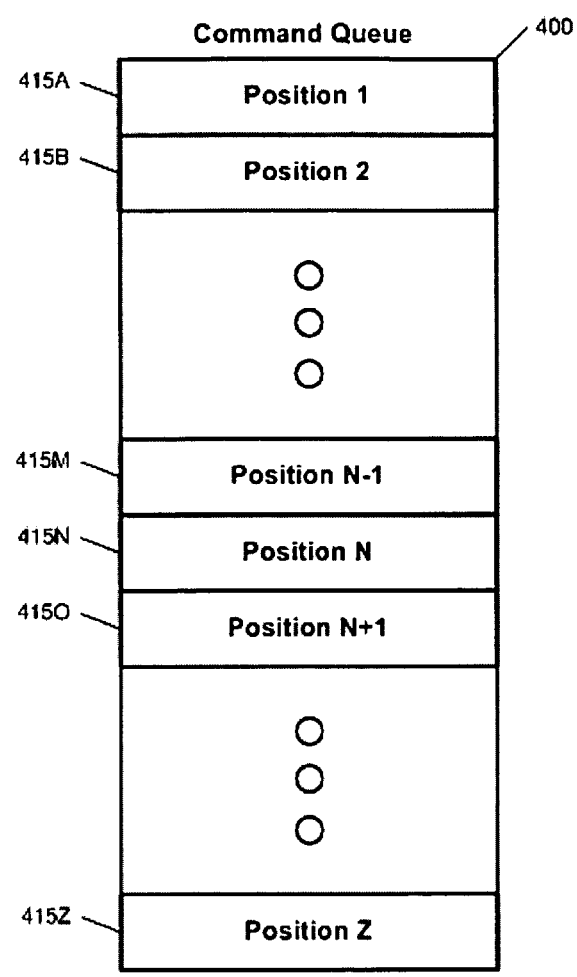
FIG. 4 represents a schematic of a possible resource node command queue.

FIG. 4 represents a possible schematic of a resource node's command queue. Command queue 400 comprises one or more command positions 415A through 415Z where the number of positions depends on the implementation of the resource node.

Although FIG. 4 presents a common representation of command queue, one ordinarily skilled in the art will recognize there are many possible ways to order the processing of a set of commands even those that are not data structures. As used herein, "command queue" should be interpreted broadly to encompass any ordering of commands for processing. Example command queues include those ordered by time, order by priority, first come first serve, having just a pending command and one executing command, or other ordering determined by a resource node.

Resource nodes determine the ordering or the reordering of commands based upon when to process the command. Once the ordering is determined based upon the resource node information, command urgency or importance, the resource node will reorder the queue by placing the command in command queue 400 at an appropriate position. As used herein, "position" should be interpreted broadly to encompass the concept of command ordering relative to other commands, pending or executing. Resource nodes comprise the ability to manipulate command queue 400. Furthermore, the ordering could indicate that the resource node might never process the command; therefore, the command is not placed in the queue at all. This concept also includes circumstances where the resource node is so loaded, it cannot process incoming messages at all. Consequently, the concept of a resource node determining "when" to process a command includes ignoring a resource command message.

In a preferred embodiment, command queue 400 generally represents a first come first serve queue where the resource node modifies command positions based upon QoS, preferred provider information, or command identifier.

Processing Resource Command Messages

Figure 5:
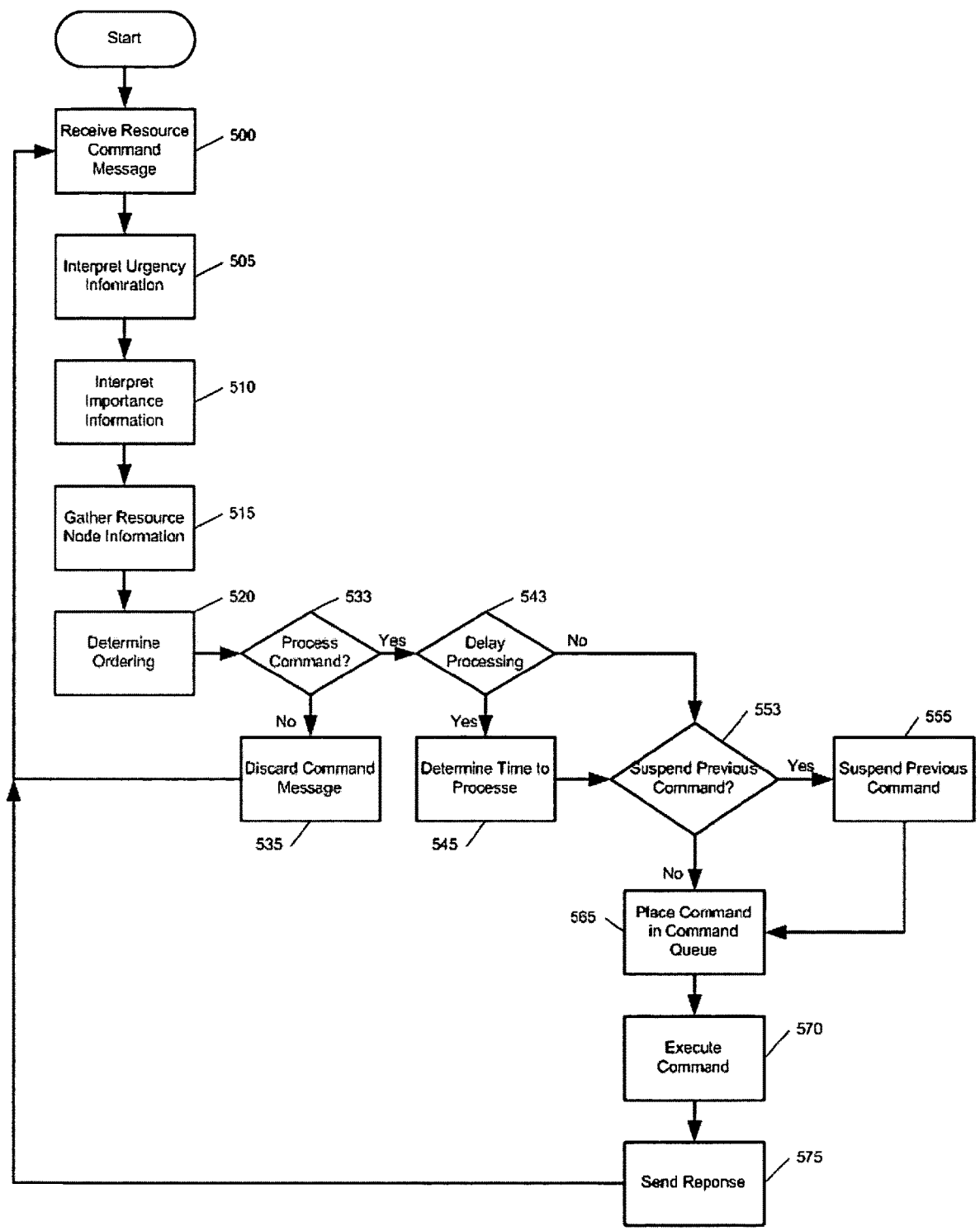
FIG. 5 represents a schematic of possible steps for processing a resource command message.

FIG. 5 represents a set of possible steps employed by a resource node to process command queue messages. Resource consumers send resource command messages to one or more resource nodes; therefore, the steps presented in FIG. 5 occur substantially in parallel when more than one resource node, preferably redundant nodes, receives the resource command message.

At step 500, a resource node receives a resource command message. The resource command message could be addressed to the individual node or addressed to a set of resource nodes collectively. In a preferred embodiment, the resource node receives the resource command message at an IP address, unicast or multicast. It is contemplated that the resource node could be loaded where it is unable to receive the resource command message. If so, either another resource node processes it, or the resource consumer attempts to send the resource message again.

At step 505 the resource node begins the evaluation of the resource command message. The resource node interprets the urgency information within the resource command message, if applicable. Urgency information includes direct or indirect information. Direct information comprises references to a time when the command should be processed. For example, direct information includes stating the resource consumer's desired urgency as an absolute time or a relative time. Indirect information comprises references where the resource node infers the time based upon the urgency information. For example, when the resource command message includes preferred provider information, the resource node can alter when the command will be processed.

At step 510 the resource node continues with the evaluation of the resource command message by interpreting the importance information, if applicable. As in the step for interpreting the urgency information, the importance information includes direct or indirect information. Direct information includes absolute or relative priority information. Indirect information includes QoS information. QoS information informs the resource node to preferentially process commands over others to enhance performance.

At step 515 the resource node gathers relevant information regarding itself to make a final determination on when the command within the resource command message should be processed. Contemplated resource node information includes loading information, capabilities, previous commands, commands in the command queue, or other resource node centric information.

One ordinarily skilled in the art will recognize the ordering of previous steps are alterable and do not necessarily have to be followed in the order presented.

At step 520 the resource node combines its resource node information along with the information interpreted from the urgency or importance information to establish when the command in the resource command message should be processed. At step 533 the resource node determines if the command should be processed at all. If not, resource node silently discards the command message at step 535. In a preferred embodiment, the resource node autonomously determines if the resource command message is discarded and the resource consumer assumes responsibility for ensuring its resource needs are met. It is contemplated the resource node discards the command when it is fully loaded, when its command queue is full, when its resources are reserved, or other reasons where the resource node does not wish to process the command. Once discarded, the resource node again waits to receive additional resource command messages at step 500.

If the resource node determines that the command should be processed, it determines if the command should be delayed at step 543. The command could be delayed for several reasons including that the resource node is not a preferred provider or a resource consumer specifically requests a time for the command to be processed. If the command is to be delayed, at step 545 the resource node determines the amount of time for the command to be delayed. It is also contemplated the resource node could accelerate processing of a command by canceling a executing command in favor of a current command.

After handling the conditions for the command processing, at step 553, the resource node determines if a pending command should be suspended. Pending commands are suspended if the command is no longer valid as determined by information with the command parameters of the command. If the current command identifies itself as part of a group through a command identifier to which a pending command belongs, the resource node can interpret the current command as an instruction to suspend the pending command at step 555. Suspending includes further delaying the pending command from being processed, halting the pending command from being processed, removing the pending command from the command queue, deleting the pending command, or other actions that result in altering the pending command's processing time.

At step 565, the resource node has completed its determination on when the command should be processed and the resource node places the command in the queue of commands. In a preferred embodiment, the command queue ordering is modified by the resource node based upon priority, urgency, or command identifier. On ordinarily skilled in the art will recognize there are many ways to embody a command queue other than those presented. It is contemplated the resource node places the command in an absolute position or a relative position within the command queue. If the command queue has a set number of positions, an absolute position represents a specific index into a standard queue, for example. Examples of absolute positions include the currently executing command position, the first positions, or last position. A relative position represents a position, possibly ordered by time or priority, relative to other commands in the queue.

At step 570 the resource node executes the command when appropriate. Furthermore, if applicable, the resource node will send a resource command response message to the resource consumer at step 575. In a preferred embodiment, the response includes acknowledgement the command is processed, requested data, or an indication of ability to process the command. In yet a more preferred embodiment, the resource node reserves at least a portion of the requested allocation of resources for the resource consumer and informs the resource consumer of the indication of its ability. For example, if a resource consumer requests to store 100 gigabytes of data, the resource node could response with an indication that it is able to store 50 gigabytes. The resource node could also reserve the 50 gigabytes to allow the resource consumer to aggregate other resources node's abilities to achieve the 100 gigabytes.

It is also contemplated that a resource command response message could be received by other resource nodes and could be interpreted as an instruction to suspend processing of the command in the resource command message. One ordinarily skilled in the art of software or firmware develop will appreciate that step 570 could execute as a parallel thread or task to the message handling steps.

In a preferred embodiment, the resource node steps illustrated in FIG. 5 are stored in a computer-readable medium as a series of instructions to be executed on a processing unit. One ordinarily skilled the art of firmware or software development will recognize there are many possible ways to implement the steps, all of which fall within the scope of the inventive material. In yet another preferred embodiment, it is contemplated that a plurality of resource nodes processes a resource command message substantially in parallel. In a more preferred embodiment, the plurality of resource nodes processes the resource command message within three seconds of each other.

Accessing Resource Devices

Figure 6:
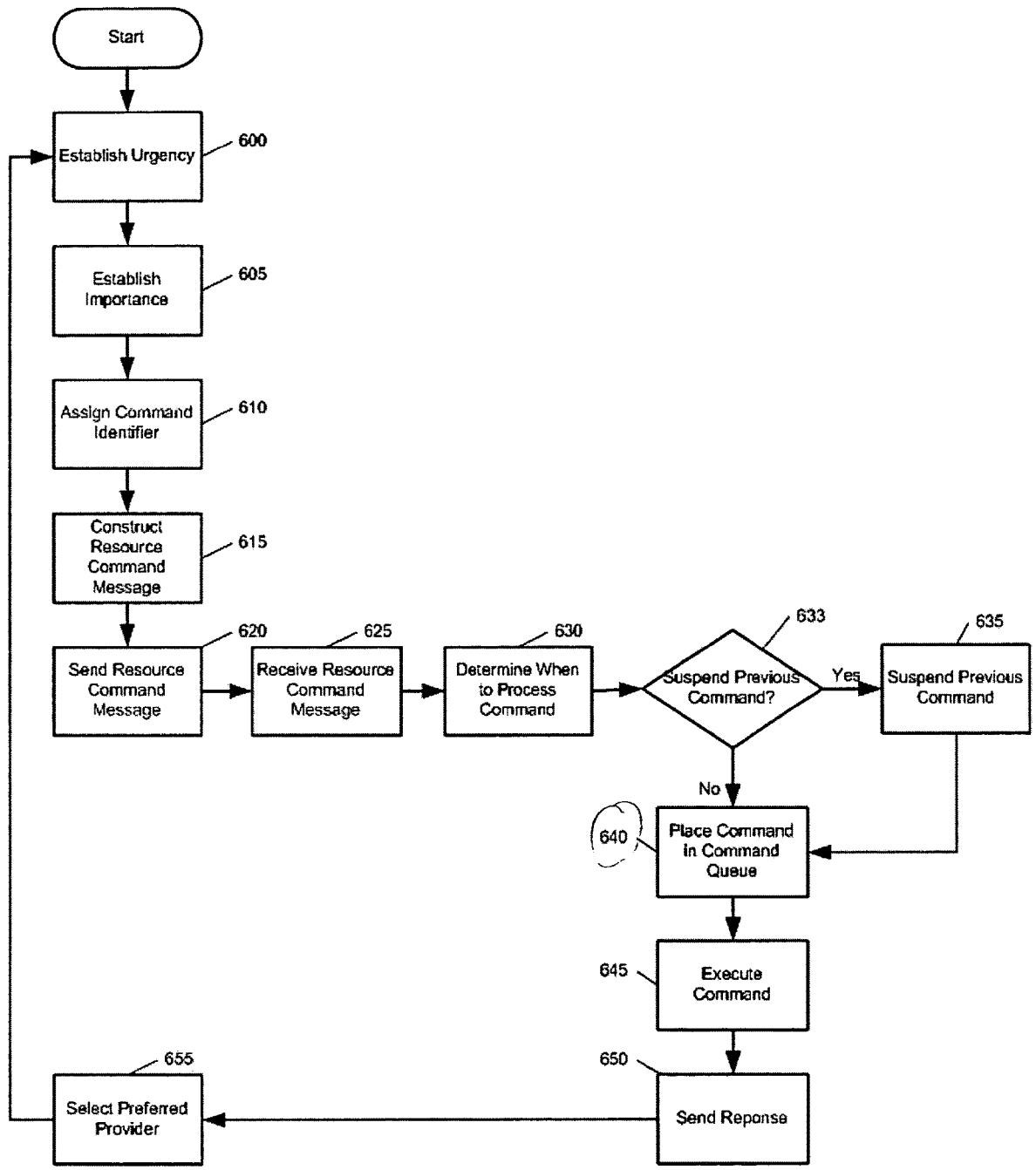
FIG. 6 represents a schematic of possible steps for accessing a resource device.

FIG. 6 represents a set of possible steps employed by a resource consumer and a resource node to enable access to a resource. Resource consumers send resource command messages to a resource device comprising one or more resource nodes. In a preferred embodiment, it is contemplated that one or more resource consumers perform the steps independently of each other, possibly interacting with the same resource nodes.

At step 600 a resource consumer begins the process of constructing a resource command message in a computer readable memory. The resource consumer establishes its desired sense of urgency associated with the command in the resource command message. At step 605 the resource consumer establishes the importance of the command. Both step 600 and 605 occur, if applicable, for the current resource command message. At step 610, the resource consumer optionally assigns a command identifier that signifies how the current command relates to previous commands or subsequent commands. Steps 600, 605, or 610 can occur in any desirable order.

At step 615 the resource consumer constructs the resource command message based upon the command, command parameters including the command identifier, urgency, or importance.

At step 620 the resource consumer sends the resource command message to a resource device. In a preferred embodiment, the resource command message is formed into one or more packets and sent over a packet switched network. In an especially preferred embodiment, the packets are sent using UDP. Furthermore, when the resource consumer sends the resource command message, it is preferable that the resource consumer sends the message to a group of resource nodes or all of them collectively. In a preferred embodiment, the resource command message is sent via multicast where each resource node is a member of a multicast group whose address represents the resource device. It is contemplated that resource command messages are sent slowly at first to avoid congestion on the communication path coupling the resource consumers and the resource nodes. One ordinarily skilled in the art of network protocols, including TCP, will appreciate a slow start for congestion avoidance.

At step 625, the resource node receives the resource command message and begins processing the message. In a preferred embodiment, multiple resource nodes are able to receive the same resource message. Furthermore, in a yet more preferable embodiment, multiple resource nodes are equally able to process the command and responded back to the resource consumer who sent the resource command message.

At step 630, the resource node utilizes the urgency, importance, or command identifier information as well as information regarding itself to determine when the command should be processed. The resource node determines if a previous command should be suspended from processing at step 633. If so, at step 635, the previous command is suspended, otherwise the current command is placed in a queue of commands at step 640. Once the command's turn for processing arrives, the resource node executes the command at step 645 and sends an appropriate response at step 650.

In a preferred embodiment, at step 655, the resource consumer could receive multiple responses from multiple resource nodes where the resource nodes offer redundant capabilities. If so, the resource consumer selects a preferred resource node among the plurality of nodes. In an especially preferred embodiment, the preferred resource node is selected based upon which of the redundant nodes responds first. Each resource consumer interacting with a resource device comprising a plurality of resource nodes is able to have a completely different preferred provider. Furthermore, the preferred provide is able to change as conditions in the environment change. Consequently, at any given time, resource consumers experience solid performance, load balancing, or responsiveness naturally without imposing extraneous management.

In a preferred embodiment, the steps presented in FIG. 6 are stored in a computer readable media in the form of instructions to be executed on a processing unit.

Advantages

Resource consumers and resource devices comprising one or more resource nodes realize a number of advantages as a natural result through employing resource command messages.

Resources scale naturally as additional resource devices or resource nodes are added to the system. Each individual resource node focuses on its main responsibilities and processing resource command messages; therefore, they are autonomous allowing for scaling the system at an atomic level up to the ability of the communication path to handle resource command messages. The bandwidth of the communication path is more efficiently utilized because all traffic is relevant to accessing the resource rather than system management or maintenance. Furthermore, incremental costs are reduced because if the resource system requires further capabilities individual resource nodes can be added as opposed to replicating an entire resource system.

Both performance and responsiveness of the resources increase as additional redundant nodes are added to the system. Resource consumers send resource command messages to the resource nodes collectively, thereby allowing more than one resource node to respond. Given different loading across each resource node, the resource node most able to respond responds the quickest resulting in a fast response time. In addition, multiple resource nodes, not necessarily redundant nodes, process resource command message substantially in parallel providing higher performance to the resource consumer. Resource consumers use importance information to indicate to a resource node the priority that should be considered for processing the command. Importance information aids in the handling of QoS data. Multiple responses are reduced through a slow start for congestion avoidance to limit consumption of bandwidth. In addition, resource consumers each have their own view of the resource nodes and independently select a preferred provider when working with redundant resource nodes to aid in securing fastest response times and reduced multiple messages.

Load balancing is achieved as a natural result across redundant resource nodes because each node functions independently allowing each node to handle as much traffic as they are designed to handle. Resource consumers have no a priori preference which resource node services its requests; however, the resource consumer can bias which node is preferred to reduce multiple responses. Even though a resource consumer could have a preferred provider, it can change the preferred provider based upon how other resource nodes respond through continued interactions. Therefore, loading is balanced across nodes. As additional nodes are added to the system to reduce loading, resource consumers are able to cycle through preferred nodes if required so that multiple resource consumers effectively share resource nodes.

Thus, specific compositions and methods of resource command messages have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

The invention claimed is:

1. A method, comprising:
receiving, at a resource node, a first resource command from a resource consumer, wherein the first resource command includes a command parameter with a resource need for the resource consumer;
at the resource node, interpreting an urgency parameter for the first resource command, the urgency parameter for the first resource command comprising information gathered from responses received from a plurality of resource nodes, wherein the interpreting of the urgency parameter is based, at least in part, on indirect urgency information for the first resource command, the indirect urgency information indicating the resource node is not a preferred provider for the first resource command;
identifying, at the resource node, resources available to the resource node;
determining, at the resource node, ability to execute the first resource command based on identified resources available and the command parameter;
detecting, at the resource node, a second resource command and, after interpreting an urgency parameter for the second resource command, suspending processing of a previous resource command, wherein interpreting the urgency parameter for the second resource command is based, at least in part, on indirect urgency information for the second resource command, and wherein the urgency parameter for the second resource command indicates the resource node is a preferred provider for the second resource command; and
determining, at the resource node, an order in which to process the first resource command and the second resource command in a queue and reordering the queue by placing the first resource command and the second resource command at appropriate positions in the queue, wherein reordering the queue comprises placing the first resource command after the second resource command in the queue responsive to the resource node not being a preferred provider for the first resource command and a preferred provider for the second resource command.

2. The method of claim 1, further comprising:
receiving, at the resource node, responses from the plurality of resource nodes communicatively connected to the resource node, wherein the responses include importance information.

3. The method of claim 1, wherein the resource node parameter comprises one or more of loading information of the resource node, resource node capabilities, previous resource commands received by the resource node, and a number of resource commands in a command queue at the resource node.

4. The method of claim 1, further comprising:
autonomously determining, at the resource node, to discard the first resource command based at least in part on one or more of the resource node being fully loaded and on resource node resources being reserved.

5. The method of claim 1, further comprising:
determining, at the resource node, to delay processing the first resource command.

6. An article of manufacture, comprising:
a non-transitory computer-readable medium; and
instructions within the computer-readable medium that, when executed, cause a resource node to:
receive a first resource command from a resource consumer, wherein the first resource command comprises a command parameter with a resource need for the resource consumer;
interpret an urgency parameter for the first resource command, the urgency parameter for the first resource command comprising information gathered from responses received from a plurality of resource nodes, wherein the interpreting of the urgency parameter is based, at least in part, on indirect urgency information for the first resource command, the indirect urgency information indicating the resource node is not a preferred provider for the first resource command;
identify resources available to the resource node;
determine ability to execute the first resource command at the resource node based on identified resources available and the command parameter;
detect a second resource command and, after interpreting an urgency parameter for the second resource command, suspend processing of a previous resource command, wherein interpreting the urgency parameter for the second resource command is based, at least in part, on indirect urgency information for the second resource command and wherein the urgency parameter for the second resource command indicates the resource node is a preferred provider for the second resource command; and
determine an order in which to process the first resource command and the second resource command in a queue and reordering the queue by placing the first resource command and the second resource command at appropriate positions in the queue, wherein reordering the queue comprises placing the first resource command after the second resource command in the queue responsive to the resource node not being a preferred provider for the first resource command and a preferred provider for the second resource command.

7. The article of manufacture of claim 6, wherein the instructions within the computer-readable medium, when executed, further cause the resource node to:
receive responses from the plurality of resource nodes communicatively connected to the resource node, wherein the responses include importance information.

8. The article of manufacture of claim 6, wherein the resource node parameter comprises one or more of loading information of the resource node, resource node capabilities, previous resource commands received by the resource node, and a number of resource commands in a command queue at the resource node.

9. The article of manufacture of claim 6, wherein the instructions within the computer-readable medium, when executed, further cause the resource node to:
autonomously determine to discard the first resource command based at least in part on one or more of the resource node being fully loaded and on resource node resources being reserved.

10. The article of manufacture of claim 6, wherein the instructions within the computer-readable medium, when executed, further cause the resource node to:
determine to delay processing the first resource command.

11. A resource node, comprising:
a memory configured to store a command queue and resource node data;
a processing unit configure to:
receive a first resource command from a resource consumer requesting at least one of a plurality of resources, wherein the first resource command comprises a command parameter with a resource need for the resource consumer;
interpret an urgency parameter for the first resource command, the urgency parameter for the first resource command comprising information gathered from responses received from a plurality of resource nodes, wherein the interpreting of the urgency parameter is based, at least in part, on indirect urgency information for the first resource command, the indirect urgency information indicating the resource node is not a preferred provider for the first resource command;
identify resources available to the resource node;
determine ability to execute the first resource command at the resource node based on identified resources available and the command parameter;
detect a second resource command and suspend processing of a previous command, wherein interpreting the urgency parameter for the second resource command is based, at least in part, on indirect urgency information for the second resource command and wherein the urgency parameter for the second resource command indicates the resource node is a preferred provider for the second resource command; and
determine an order in which to process the first resource command and the second resource command in a queue and reorder the queue by placing the first resource command and the second resource command at appropriate positions in the queue, wherein reordering the queue comprises placing the first resource command after the second resource command in the queue responsive to the resource node not being a preferred provider for the first resource command and a preferred provider for the second resource command.

12. The resource node of claim 11, wherein the resource node data comprises one or more of loading information for the resource node, resource node capabilities, previous resource commands received by the resource node, and a number of resource commands contained in the command queue.

13. The resource node of claim 11, wherein the processing unit is further configured to:
   autonomously determine to discard the first resource command based at least in part on one or more of the resource node being fully loaded and on resource node resources being reserved.

\* \* \* \* \*